(12) United States Patent
Wu et al.

(10) Patent No.: US 10,135,712 B2
(45) Date of Patent: Nov. 20, 2018

(54) AUTO-SCALING SOFTWARE-DEFINED MONITORING PLATFORM FOR SOFTWARE-DEFINED NETWORKING SERVICE ASSURANCE

(71) Applicant: AT&T Intellectual Property I, L.P., Atlanta, GA (US)

(72) Inventors: Tsong-Ho Wu, Englishtown, NJ (US); Wen-Jui Li, Bridgewater, NJ (US); Hasan Erkan, Bloomfield Township, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 182 days.

(21) Appl. No.: 15/092,681

(22) Filed: Apr. 7, 2016

(65) Prior Publication Data

US 2017/0295082 A1  Oct. 12, 2017

(51) Int. Cl.
*G06F 15/173* (2006.01)
*H04L 12/26* (2006.01)
(Continued)

(52) U.S. Cl.
CPC .......... *H04L 43/14* (2013.01); *G06F 9/45558* (2013.01); *H04L 43/08* (2013.01);
(Continued)

(58) Field of Classification Search
None
See application file for complete search history.

(56) References Cited

U.S. PATENT DOCUMENTS

| 8,706,852 B2 | 4/2014 | Kunze et al. |
| 8,825,550 B2 | 9/2014 | Marr et al. |

(Continued)

OTHER PUBLICATIONS

Jiang, Jing, "Optimised Auto-scaling for Cloud-based Web Service," A thesis submitted for the degree of Doctor of Philosophy, Feb. 2015.

(Continued)

*Primary Examiner* — Younes Naji
(74) *Attorney, Agent, or Firm* — Hartman & Citrin LLC

(57) ABSTRACT

Concepts and technologies disclosed herein are directed to an auto-scaling software-defined monitoring ("SDM") platform for software-defined networking ("SDN") service assurance. According to one aspect of the concepts and technologies disclosed herein, an SDM controller can monitor event data associated with a network event that occurred within a virtualized IP SDN network that is monitored by a virtualized SDM resources platform. The SDM controller can measure, based upon the event data, a quality of service ("QoS") performance metric associated with the virtualized SDM resource platform. The SDN controller can determine, based upon the QoS performance metric, whether an auto-scaling operation is to be performed. The auto-scaling operation can include reconfiguring the virtualized SDM resources platform by adding virtual machine capacity for supporting event management tasks either by instantiating a new virtual machine or by migrating an existing virtual machine to a new hardware host.

18 Claims, 8 Drawing Sheets

(51) Int. Cl.
H04L 29/08 (2006.01)
G06F 9/455 (2018.01)
(52) U.S. Cl.
CPC .............. *H04L 43/16* (2013.01); *H04L 67/10* (2013.01); *G06F 2009/4557* (2013.01); *G06F 2009/45591* (2013.01); *G06F 2009/45595* (2013.01)

(56) References Cited

U.S. PATENT DOCUMENTS

| | | | |
|---|---|---|---|
| 8,856,339 B2 | 10/2014 | Mestery et al. | |
| 8,918,510 B2 | 12/2014 | Gmach et al. | |
| 9,069,599 B2 | 6/2015 | Martinez et al. | |
| 2013/0268588 A1 | 10/2013 | Chang et al. | |
| 2014/0280961 A1 | 9/2014 | Martinez et al. | |
| 2014/0317293 A1 | 10/2014 | Shatzkamer | |
| 2014/0351422 A1 | 11/2014 | Madani et al. | |
| 2015/0039744 A1 | 2/2015 | Niazi et al. | |
| 2015/0169291 A1* | 6/2015 | Dube | G06F 8/20 717/101 |
| 2015/0281113 A1 | 10/2015 | Siciliano et al. | |
| 2015/0341377 A1 | 11/2015 | Kasturi et al. | |
| 2016/0117180 A1* | 4/2016 | Cardonha | G06F 9/44505 713/100 |
| 2017/0277553 A1* | 9/2017 | Zada | G06F 9/45558 |
| 2017/0289002 A1* | 10/2017 | Ganguli | H04L 43/0876 |

OTHER PUBLICATIONS

Liyanage et al., "Security for Future Software Defined Mobile Networks," 2015 9$^{th}$ International Conference on Next Generation Mobile Applications, Services and Technologies, Sep. 9-11, 2015, IEEE.

* cited by examiner

AUTO-SCALING SOFTWARE-DEFINED MONITORING PLATFORM FOR SOFTWARE-DEFINED NETWORKING SERVICE ASSURANCE

BACKGROUND

Cloud-based software-defined networking ("SDN") services are being pursued by major telecommunications carriers around the world. Cloud-based SDN services allow customers to create and activate new services and to update existing services on-demand and in near real-time. SDN provides "network-on-demand" services that allow network infrastructure to adapt to user demand. Cloud SDN service assurance is realized through an automated service closed control loop. Successful operation of the automated service closed loop for SDN service assurance requires the successful execution of event monitoring and analytics in near real-time.

SDN "network-on-demand" services create management traffic storm impacts on network event monitoring systems due to real-time, dynamic changes and rapid, on-demand growth of SDN systems. These dynamic, unpredictable, and continuous SDN management traffic patterns make traditional, static event monitoring systems obsolete.

SUMMARY

The concepts and technologies disclosed herein are directed to an auto-scaling software-defined monitoring ("SDM") platform for SDN service assurance. According to one aspect of the concepts and technologies disclosed herein, an SDM controller can monitor event data associated with a network event that occurred within a virtualized IP SDN network that is monitored by a virtualized SDM resources platform. The SDM controller can measure, based upon the event data, a quality of service ("QoS") performance metric associated with the virtualized SDM resource platform. The SDN controller can determine, based upon the QoS performance metric, whether an auto-scaling operation is to be performed.

In some embodiments, the QoS performance metric includes a network event processing throughput. The QoS performance metric can alternatively or additionally include other metrics, such as, for example, response time In some embodiments, the SDM controller can determine whether the auto-scaling operation is to be performed at least in part by determining whether the virtualized SDM resources platform has been degraded. In some embodiments, degradation of the virtualized SDM resources platform is determined based upon whether the event processing throughput has fallen below a threshold value.

In some embodiments, the auto-scaling operation can include reconfiguring the virtualized SDM resources platform by adding virtual machine capacity for supporting event management tasks. In some embodiments, virtual machine capacity can be added by instantiating one or more new virtual machines for supporting event management tasks. The SDM controller can generate an alert directed to an SDN controller to notify the SDN controller of the new virtual machine(s) to be instantiated. In some other embodiments, virtual machine capacity can be added by migrating a virtual machine to a new hardware host.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
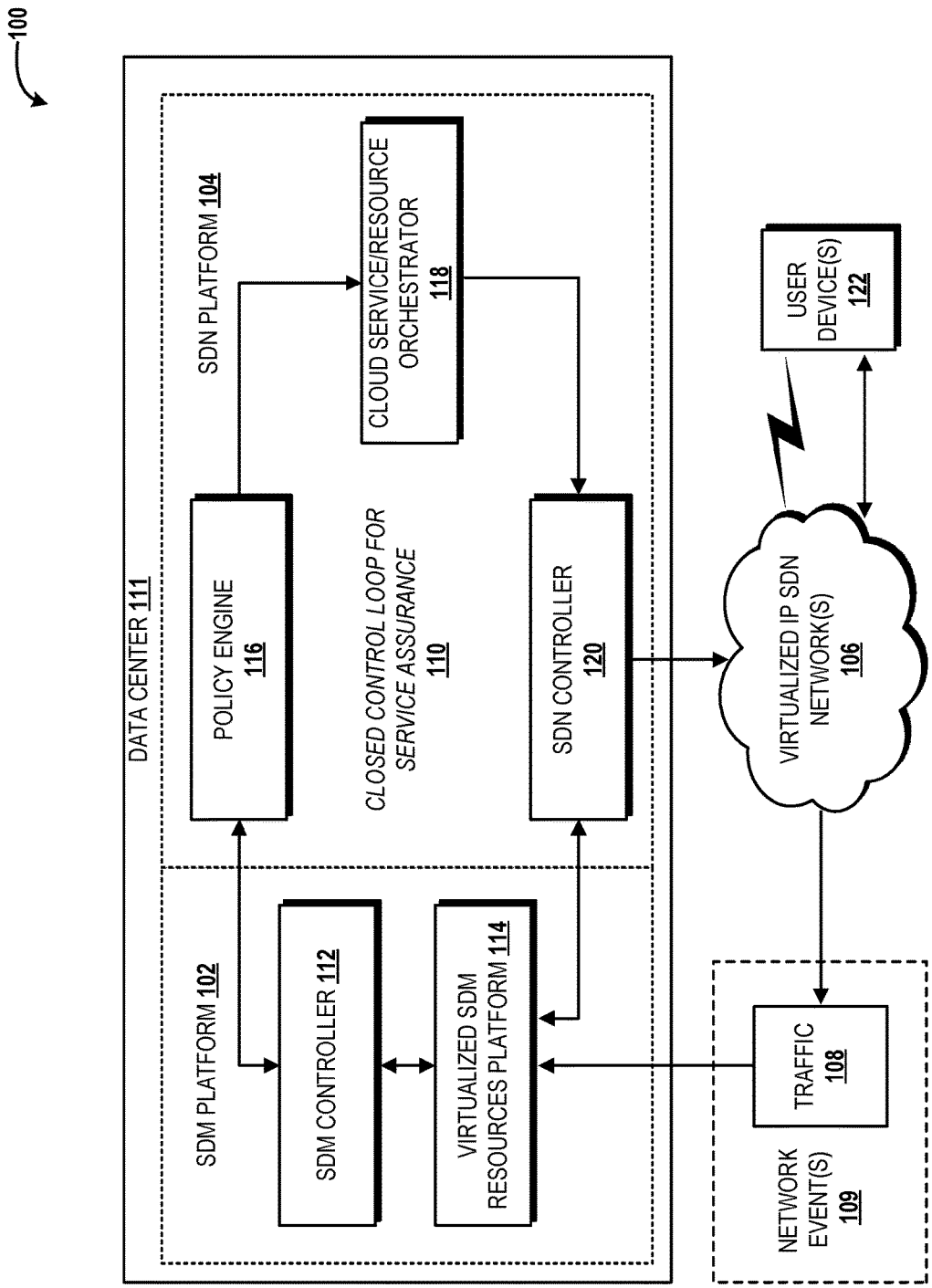
FIG. 1 is a block diagram illustrating an operating environment in which aspects of the concepts and technologies disclosed herein can be implemented.

The concepts and technologies disclosed herein are directed to an auto-scaling SDM platform for SDN service assurance. SDN "network-on-demand" services generate management traffic storms due to the real-time dynamic changes, and the rapid, on-demand, growth of SDN services. Dynamic, unpredictable, and continuous SDN network management traffic patterns cannot be successfully monitored by the traditional static network event monitoring systems available today. Thus, a dynamic auto-scaling network event monitoring system that allows monitoring resources to adapt to the monitoring requirements of SDN "network-on-demand" services is needed.

Network event monitoring system virtualization is a solution, whereby one or more virtual machines ("VMs") can be instantiated, stopped, and migrated in near real-time to meet monitoring demand. The concepts and technologies disclosed herein provide, among other capabilities, auto-scaling event monitoring capabilities to ensure that an acceptable level of network event processing throughput is available under capacity reduction events caused by the rapid growth and dynamic changes of SDN "network-on-demand" services.

An analytics-enabled auto-scaling SDM platform architecture disclosed herein provides "monitoring-on-demand" to adapt network monitoring capacity to the dynamic, unpredictable, and fast growth traffic patterns generated by SDN "network-on-demand" services with assurance of an acceptable network event processing throughput. An SDM controller provides event-oriented Quality of Service ("QoS")

monitoring, measurements, analytics, and resource auto-scaling on a virtualized SDM platform. Algorithms are provided to perform event-oriented QoS measurement, analytics, and resource auto-scaling on the virtualized SDM platform to ensure an acceptable level of network event processing throughput by the virtualized SDM platform.

Network event monitoring and analytics components are an integral part of the automated service closed loop control in cloud SDN "network-on-demand" networks to ensure successful customer service delivery. However, current efforts on service control loop automation are on policy engine, cloud orchestrator, and SDN controller. An adaptive and auto-scaling monitoring system that can adapt the monitoring infrastructure to support SDN "network-on-demand" service requirements is the missing link in the exiting service control loop. The concepts and technologies disclosed herein close the gap of automation needed in the service closed control loop for SDN service assurance. Thus, any telecommunications carriers and solution/equipment vendors targeted for this cloud SDN market will need such auto-scaling monitoring-on-demand system to meet automated service assurance commitment using cloud SDN infrastructure.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including hand-held devices, mobile devices, wireless devices, multiprocessor systems, distributed computing systems, microprocessor-based or programmable consumer electronics, minicomputers, mainframe computers, routers, switches, other computing devices described herein, and the like.

Referring now to FIG. 1, a block diagram illustrating an operating environment 100 in which aspects of the concepts and technologies disclosed herein can be implemented will be described. The operating environment 100 illustrates an SDM platform 102 and an SDN platform 104. The SDM platform 102 monitors operations of the SDN platform 104 as will be described in greater detail herein.

The SDN platform 104 can create and manage intelligent networks that are programmable, application-aware, and more open than traditional networks. In the illustrated embodiment, the SDN platform 104 creates and manages one or more virtualized Internet protocol ("IP") SDN networks 106. The SDN platform 104 provides an agile and cost-effective communications platform for handling the dramatic increase in data traffic on networks by providing a high degree of scalability, security, and flexibility. The SDN platform 104 provides several benefits. The SDN platform 104 allows for the creation of multiple virtual network control planes on common hardware. The SDN platform 104 can help extend service virtualization and software control into many existing network elements. The SDN platform 104 enables applications to request and manipulate services provided, at least in part, by the virtualized IP SDN network(s) 106, and to allow the virtualized IP SDN network(s) 106 to expose network states back to applications. The SDN platform 104 can expose network capabilities through one or more application programming interfaces ("APIs") (not shown), making the control of network equipment remotely accessible and modifiable via third-party software clients using open protocols such as OPENFLOW, available from Open Networking Foundation ("ONF").

The SDM platform 102 provides a capability to monitor, on-demand, traffic 108 associated with one or more network events 109 that occur during operation of the virtualized IP SDN network(s) 106. The SDM platform 102 can adapt its monitoring capabilities to the dynamic, unpredictable, and fast growth of the traffic 108 to ensure an acceptable level of throughput for processing network events (referred to herein as "network event processing throughput") is maintained, subject to available hardware host resources. As used herein, "network event processing throughput" is the number of network events per second processed by the SDM platform 102. The SDM platform 102 is a shared distributed infrastructure to support SDN event life-cycle management, including event detection, event filtering, event categorization, event response, and event closure.

As used herein, a "network event," such as one of the network events 109, is a network occurrence that is of significance to one or more network operations performed by one or more of the virtualized IP SDN networks 106. By way of example, and not limitation, the network events 109 can include capacity utilization (e.g., VM, processor, memory, storage, and/or network I/O) exceeding a designed threshold, failure of network I/O (i.e., communications failure) at devices, or a network topology update. What constitutes a "network event" can be defined by a telecommunications carrier, and accordingly, likely will vary from carrier to carrier.

A network event can trigger one or more alarms (e.g., faults) and/or one or more notifications (e.g., operations state change) by managed monitor devices to a network management system. Alarms and/or notifications can be triggered, for example, if a severity value is "major," "critical," or otherwise set so as to trigger an alarm and/or notification. In some embodiments, one or more event collectors (not shown) can receive the network events 109 via one or more simple network management protocol ("SNMP") traps from one or more network devices operating on or in communication with one or more of the virtualized IP SDN network(s) 106. The SDM platform 102, which can include the event collectors and processors, can then associate a severity value to each of the network events 109. The severity values can be established, for example, by a telecommunications carrier that utilizes the SDM platform 102 for monitoring operations of the virtualized IP SDN network(s) 106. The severity values can include a numerical ranking, an alphabetic ranking, an alphanumeric ranking, or some other ranking, such as, for example, informational, warning, major, and critical. Intermediate severity values are also contemplated. Those skilled in the art will appreciate other severity ranking schemes to rank the significance of a network event on operations of the virtualized IP SDN network(s) 106.

The SDM platform 102 and the SDN platform 104 operate in a closed control loop for service assurance 110 designed to assure performance of SDN "network-on-demand" services. The illustrated closed control loop for service assurance 110 can operate, at least in part, in one or more data centers 111. The data center(s) 111 can include a plurality of hardware resources upon which a plurality of VMs and virtualized networking functions ("VNFs") can be instantiated. VMs and VNFs can be instantiated by the SDN platform 104 to provide the virtualized IP SDN networks 106. VMs and VNFs can be instantiated by the SDM platform 102 to provide the monitoring capabilities described herein.

The entities involved in the illustrated closed control loop for service assurance 110 include an SDM controller 112, a virtualized SDM resources platform 114, a policy engine 116, a cloud service/resource orchestrator 118, and an SDN controller 120. In the illustrated example, the SDM controller 112 and the SDN controller 120 are shown as being in communication with the virtualized IP SDN network(s) 106. It should be understood, however, that other configurations are contemplated in which any of the aforementioned entities can be configured to be in communication with the virtualized IP SDN network(s) 106. The virtualized IP SDN network(s) 106 provides one or more user devices 122 with wireless and/or wired connectivity to the data center 111 so that the user device(s) 122 can access one or more IP services.

The SDM platform 102 provides a virtual resource auto-scaling event management service to assure an acceptable level of network event processing throughput under capacity reduction events due to the rapid growth and dynamic changes of SDN services provided by the SDN platform 104. The network event processing throughput is the number of events per second processed by the SDM platform 102. The SDM platform 102 is a shared distributed infrastructure to support SDN event life-cycle management, including event detection, event filtering, event categorization, event response, and event closure. The SDM platform 102 can determine: (1) what performance metrics are to be collected and measured; (2) when to trigger VM auto-scaling operations; (3) how and where to perform VM auto-scaling operations for achieving one or more design goals; and (4) where and what details are to be disseminated via one or more output reports.

The SDM controller 112 is an engine that utilizes a control decision model to determine when, how, and where to trigger and perform VM auto-scaling operations on the virtualized SDM resources platform 114 to meet one or more design goals. The SDM controller 112 can expose one or more APIs (not shown) to facilitate integration between the virtualized SDM resources platform 114 and the SDM controller 112. The SDM controller 112 can send one or more alerts to the SDN controller 120 when an anomaly of IP network traffic patterns and/or behavior is detected.

The virtualized SDM resources platform 114 is a distributed event monitoring virtualization platform to collect and store metrics of interest. The virtualized SDM resources platform 114 can perform event life-cycle management, including event detection, event filtering, event categorization, event response, and event closure. The virtualized SDM resources platform 114 can output reports to the policy engine 116 to update capacity management policies for additional host resource allocation needed at the cluster level. A cluster is a group of hardware host resources that are allowed to be shared by VMs running on these hardware hosts. Host resources can include CPU, RAM, storage, and network I/O.

The policy engine 116 can establish and update policies for capacity management. Policies are utilized to instruct the cloud service/resource orchestrator 118 to allocate or reallocate cloud resources to meet service requirements. The cloud service/resource orchestrator 118 can orchestrate cloud resource allocation between service requirements and network resource requirements managed by the SDN Controller 120. The SDN controller 120 can instruct SDN network nodes to program node hardware for hardware resource allocation/reallocation in the virtualized IP SDN network(s) 106.

According to various embodiments, the functionality of the user device(s) 122 may be provided by one or more server computers, desktop computers, mobile devices, laptop computers, tablet computers, set-top boxes, other computing systems, and the like. It should be understood that the functionality of the user device(s) 122 can be provided by a single device, by two similar devices, and/or by two or more dissimilar devices. For purposes of describing the concepts and technologies disclosed herein, the user device(s) 122 are described herein as mobile devices such as smartphones. It should be understood that this embodiment is illustrative, and should not be construed as being limiting in any way.

Figure 2:
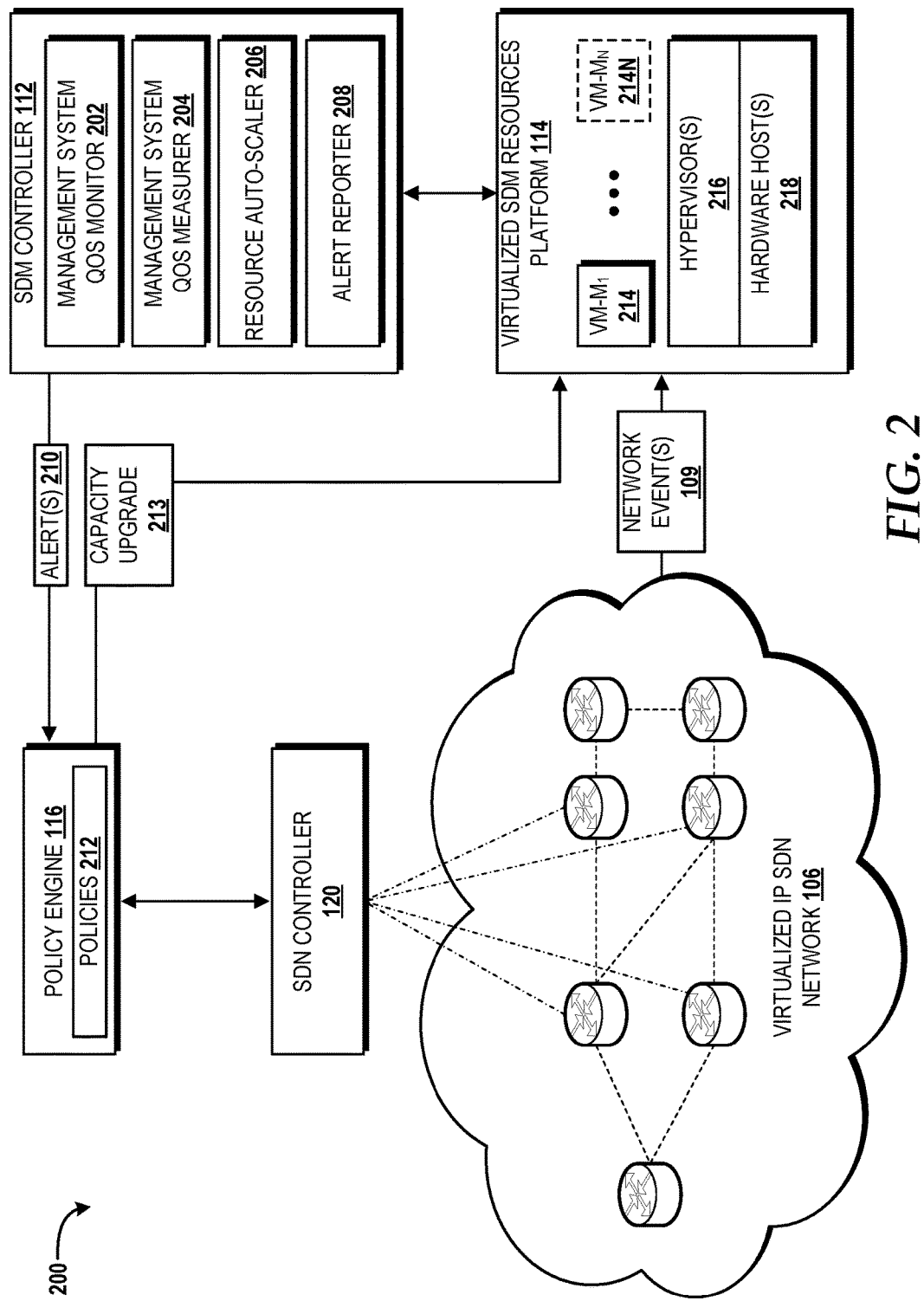
FIG. 2 is a block diagram illustrating aspects of a simplified SDM auto-scaling platform architecture framework, according to an illustrative embodiment.

Turning now to FIG. 2, a block diagram illustrating aspects of a simplified SDM auto-scaling platform architecture framework 200 will be described, according to an illustrative embodiment. The SDM auto-scaling platform architecture framework 200 includes the SDM controller 112, the virtualized SDM resources platform 114, the SDN controller 120, the policy engine 116, and the virtualized IP SDN network 106, all introduced in FIG. 1. In the illustrated embodiment, the SDM controller 112 is separated from the SDN controller 120. This design considers a principle of separation of the data and management planes. In an alternative embodiment, the SDM controller 112 can be integrated with the SDN controller 120.

The illustrated SDM controller 112 includes a management system QoS monitor 202, a management system QoS measurer 204, a resource auto-scaler 206, and an alert reporter 208. The management system QoS monitor 202, the management system QoS measurer 204, the resource auto-scaler 206, and the alert reporter 208 can be software modules executable by one or more processors of the SDM controller 112. Alternatively, the management system QoS monitor 202, the management system QoS measurer 204, the resource auto-scaler 206, and the alert reporter 208 can be implemented via separate hardware systems, each including one or more processors and having corresponding software modules executable by the processor(s).

The management system QoS monitor 202 can monitor performance metrics such as capacity utilization data (e.g., VM, processor(s), memory, storage, network I/O, and the like), network input/output event counts for each event processor (e.g., each blade), and VM inventory pool. The management system QoS measurer 204 can measure network event processing throughput per event processor in a given time period via the number of events being successfully processed through network I/O of each event processor in that time period. Management system QoS is an aggregated count of network event processing throughput by each event processor in the virtualized SDM resources platform 114. It should be understood that "network event processing throughput" is utilized herein as an illustrative design target to reflect an event packet loss metric. Other QoS performance metrics, such as, but not limited to, response time, can be incorporated as needed.

The resource auto-scaler 206 can perform auto-scaling operations of resources available from the virtualized SDM resources platform 114. The auto-scaling operations can be triggered if the network event processing throughput falls below a designed threshold. The resource auto-scaler 206 can instruct the virtualized SDM resources platform 114 to re-configure one or more hardware host resources by adding more VM capacity for event management tasks through either new VM instantiation and/or VM migration if cluster hardware resources are available. If the hardware host capacity in the same cluster is available, VM migration can be performed. A VM migration moves the VM to a new hardware host in the same cluster that has sufficient available capacity to support event management task execution requirements. Otherwise, the resource auto-scaler 206 can perform load balancing and can instantiate one or more new VMs if a new VM is available for instantiation from an inventory list and if sufficient cluster hardware host capacity is available to assign to support event monitoring tasks. If no sufficient cluster hardware host resources are available to support both VM migration and new VM instantiation, then the alert reporter 208 can generate an alert 210. The alert reporter 208 can send the alert 210 to the policy engine 116, which, in turn, can update one or more policies 212 (e.g., a capacity management policy 213) to add additional host resources at the cluster level.

The illustrated virtualized SDM resources platform 114 includes one or more event monitoring VMs (shown as VM-M$_1$ 214-VM-M$_N$ 214N; referred to herein collectively as VM-Ms 214, or singularly as VM-M 214), one or more hypervisors 216, and one or more hardware hosts 218 (e.g., server modules or "blades"). Each of the hardware hosts 218 can support one of the hypervisors 216 that, in turn, can manage one or more of the VM-Ms 214. The hardware hosts 218 can provide computing capacity to support the VM-Ms 214. The hypervisors 216 provide resource management among the VM-Ms 214 supported thereby. Each of the hardware hosts 218 can include one or more logical server clusters (best shown in FIG. 5). Each server cluster is created for resource allocation and reallocation purposes.

Figure 3:
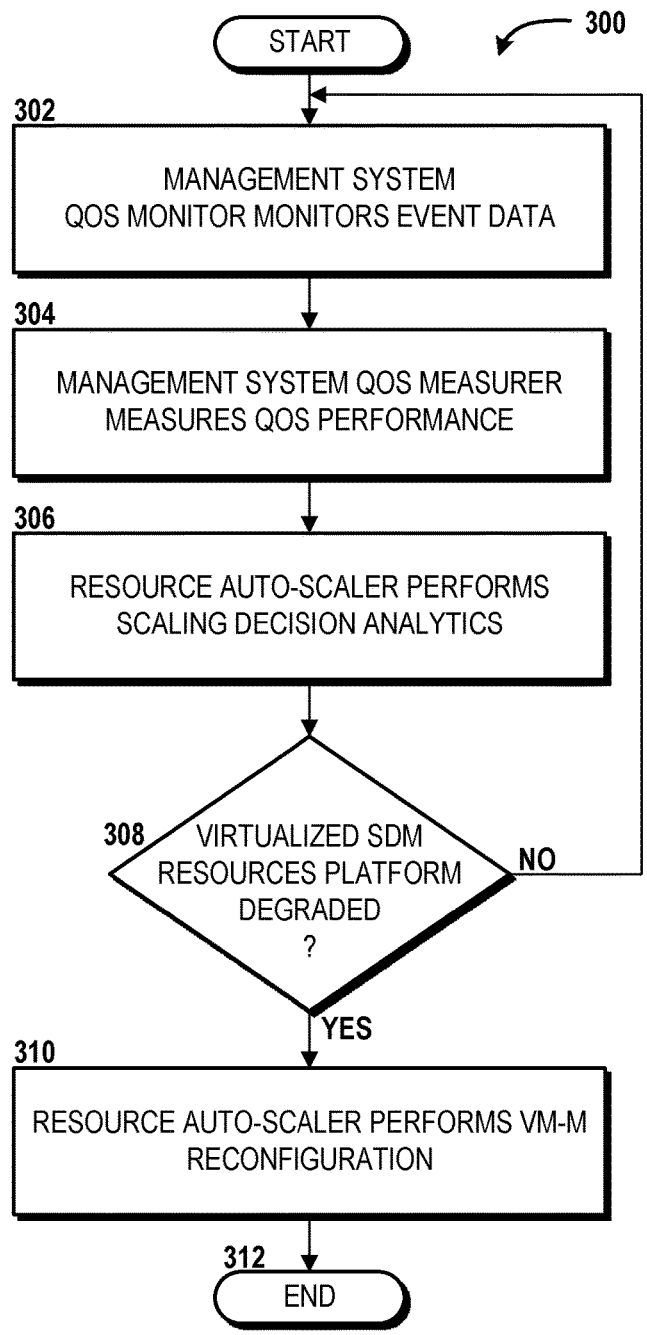
FIG. 3 is a flow diagram illustrating aspects of a method for auto-scaling an SDM platform, according to an illustrative embodiment.

Turning now to FIG. 3, a method 300 for auto-scaling the SDM platform 102 will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor or multiple processors of the SDM controller 112, the virtualized SDM resources platform 114, the policy engine 116, the cloud service/resource orchestrator 118, the SDN controller 120, the user device(s) 122, and/or other systems and/or devices disclosed herein to perform one or more operations and/or causing the processor to direct other components of the computing system or device to perform one or more of the operations.

For purposes of illustrating and describing the concepts of the present disclosure, the methods disclosed herein will be described as being performed by components of the SDM controller 112 via execution of one or more software modules such as, for example, the management system QoS monitor 202, the management system QoS measurer 204, the resource auto-scaler 206, and the alert reporter 208. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 300 will be described with reference to FIG. 3 and additional reference to FIGS. 1-2. The method 300 begins at operation 302, where the management system QoS monitor 202 monitors event data from one or more of the virtualized IP SDN networks 106. Operation 302 can be performed by the management system QoS monitor 202, which monitors system logs, performance metrics, and network events at the VM and hardware layers. Event data to be monitored can include capacity utilization (VM, CPU, RAM, storage, and/or network I/O), network I/O event counts for each event processor (e.g., blade), and VM inventory pool.

From operation 302, the method 300 proceeds to operation 304, where the management system QoS measurer 204 measures QoS performance based upon the event data. Operation 304 is performed by the management system QoS measurer 204, which measures the event processing throughput at the SDM platform layer. The event processing throughput per event processor can be computed in a given measured time period via the number of events being successfully processed (by event management tasks) through network I/O of each event processor in that measured time period. Management system QoS measurement is an aggregated count of event processing throughput by each event processor in the SDM platform 102. Here, event processing throughput is utilized as the design target to reflect event packet loss metric of QoS parameters. Other QoS metrics (such as delay-response time) can be incorporated when needed.

From operation 304, the method 300 proceeds to operation 306, where the resource auto-scaler 206 performs scaling decision analytics. From operation 306, the method proceeds to operation 308, where the resource auto-scaler 206 determines, based upon the scaling decision analytics, whether the virtualized SDM resources platform 114 has been degraded. If the resource auto-scaler 206 determines, based upon the scaling decision analytics, that the virtualized SDM resources platform 114 has not been degraded, the method 300 returns to operation 302. If, however, the resource auto-scaler 206 determines, based upon the scaling decision analytics, that the virtualized resources platform 114 has been degraded, the method 300 proceeds to operation 310. At operation 310, the resource auto-scaler 206 performs VM-M reconfiguration. From operation 310, the method 300 proceeds to operation 312, where the method 300 ends.

Operations 306, 308 and 310 are performed by the resource auto-scaler 206. Operation 306 is triggered if the event processing throughput is measured to fall below a designed threshold value. Once the event processing throughput is detected to have fallen below the design threshold value at operation 308, operation 310 is triggered to instruct the SDM controller 112 to perform VM re-reconfiguration by adding more VM capacity for event management tasks through either new VM spin-up or VM migration if cluster hardware host resources are available. The design threshold values for event processing throughput can be dynamically adjusted using a machine learning model for sub-optimal solutions when appropriate.

Figure 4A:
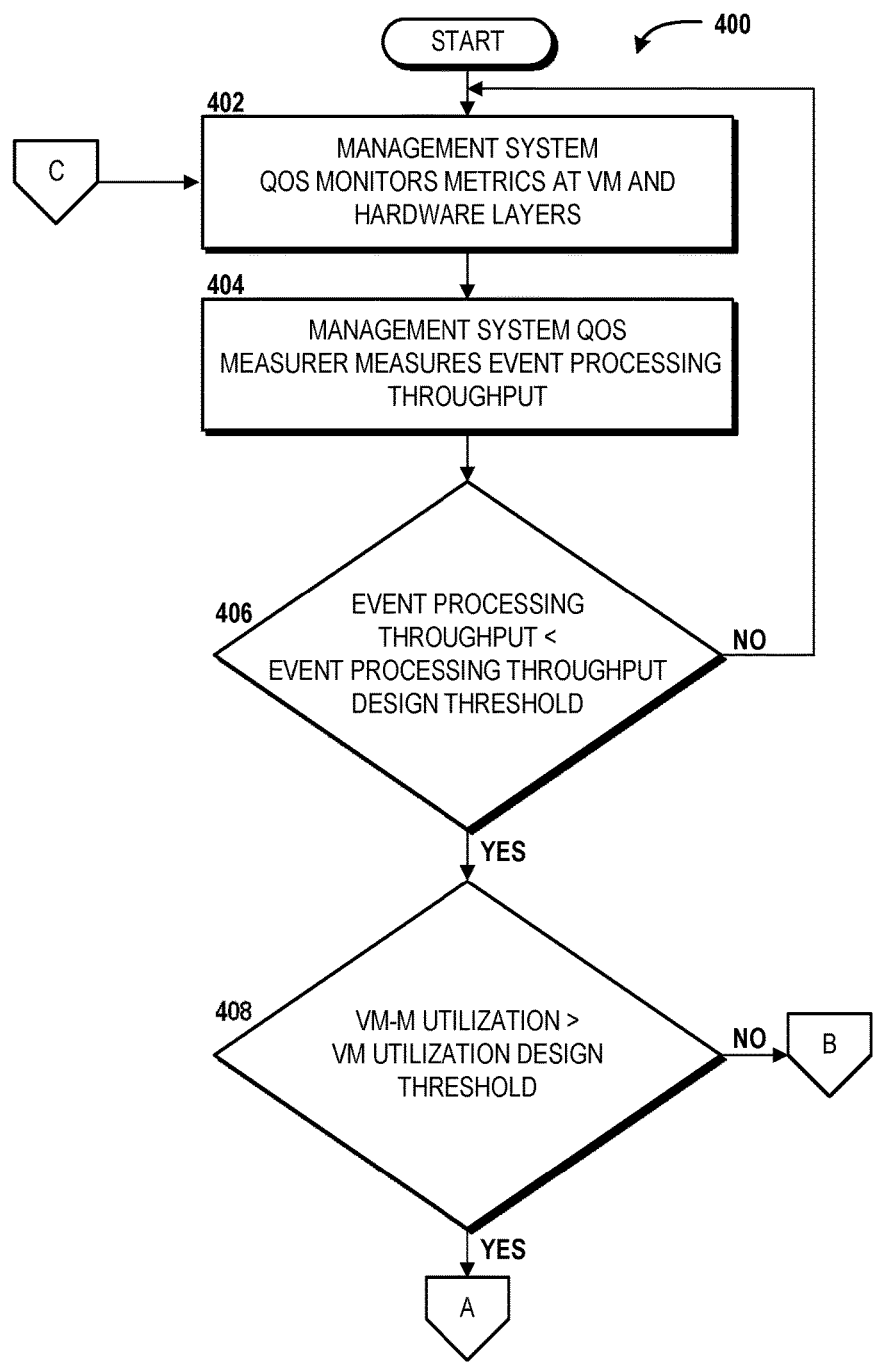
FIGS. 4A and 4B are flow diagrams illustrating aspects of another method for auto-scaling an SDM platform, according to an illustrative embodiment.

Turning now to FIG. 4, a method 400 for auto-scaling the SDM platform 102 will be described, according to an illustrative embodiment. The method 300 will be described with reference to FIG. 3 and additional reference to FIGS. 1-2. The method 400 begins at operation 402, where the management system QoS monitor 202 monitors one or more metrics at the VM and hardware layers of a monitored network, such as the virtualized IP SDN network 106. The metrics can include capacity utilization, network I/O event counts, and VM pool inventory. From operation 402, the method 400 proceeds to operation 404, where the management system QoS measurer 204 measures the event processing throughput for each event processor in a given time period via the number of events beings successfully processed through network I/O of each event processor in that time period.

From operation 404, the method 400 proceeds to operation 406, where the resource auto-scaler 206 determines whether the event processing throughput measured at operation 404 is less than an event processing throughput design threshold. If the resource auto-scaler 206 determines that the event processing throughput is not less than the event processing throughput design threshold, the method 400 returns to operation 402. If the resource auto-scaler 206 determines that the event processing throughput is less than the event processing throughput design threshold, the method 400 proceeds to operation 408, where the resource auto-scaler 206 determines whether the VM-M 214 utilization is greater than a VM-M 214 utilization design threshold. If the resource auto-scaler 206 determines that the VM-M 214 is greater than the VM-M 214 utilization design threshold, the method 400 proceeds to operation 410 (shown in FIG. 4B).

Figure 4B:
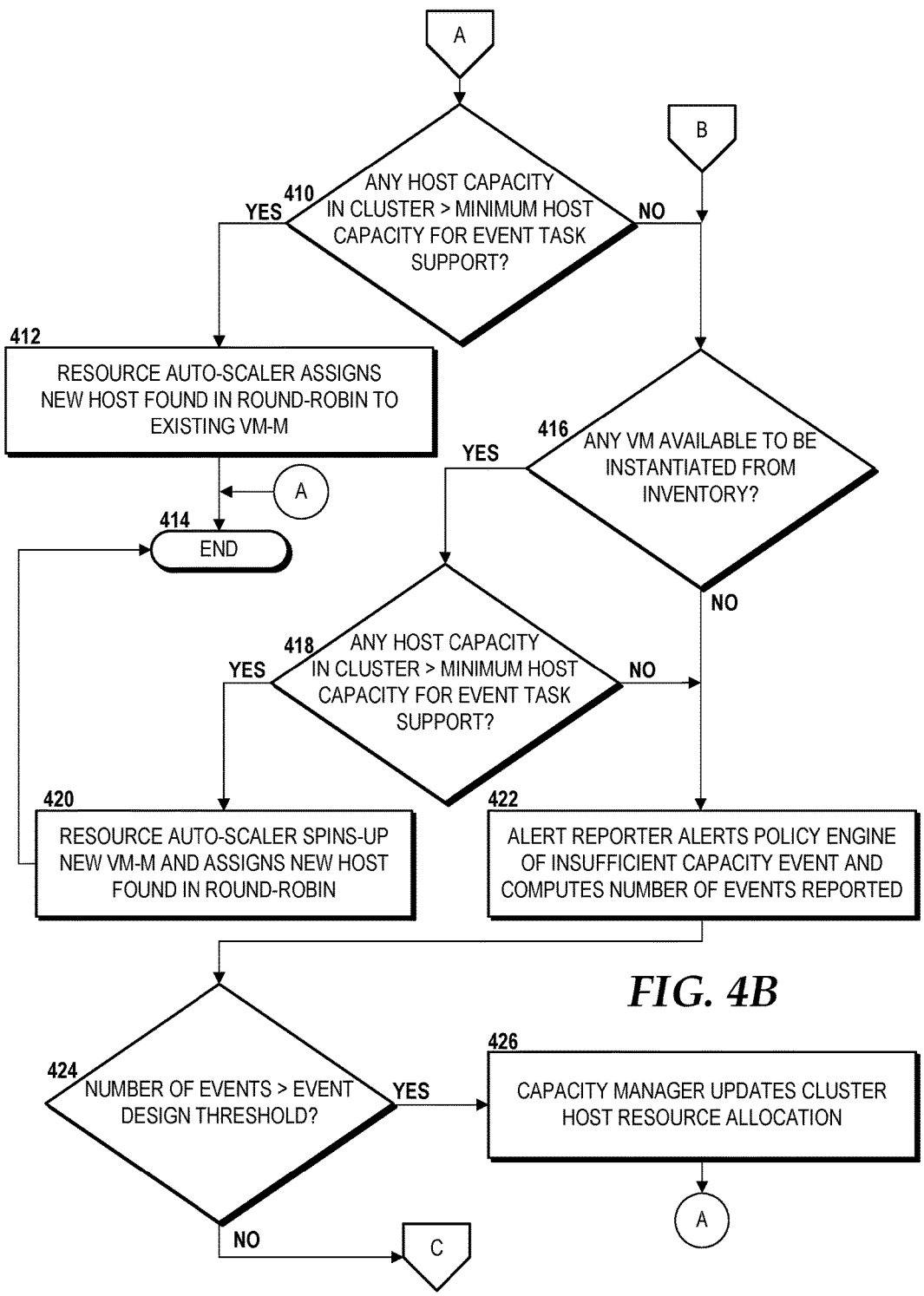

Turning now to FIG. 4B, and particularly to operation 410, the resource auto-scaler 206 determines whether the host capacity in a given cluster is greater than a minimum host capacity required to support a VM executing event monitoring instructions. If the resource auto-scaler 206 determines the host capacity is greater than the minimum host capacity, the method 400 proceeds to operation 412, where the resource auto-scaler 206 assigns a new host found in round-robin to one or more of the existing VM-Ms 214 (e.g., one of the VM-Ms 214). The method 400 then proceeds to operation 414, where the method 400 ends.

Returning to FIG. 4A, and particularly to operation 408, if the resource auto-scaler 206 determines that the VM-M 214 utilization is not greater than the VM-M 214 utilization design threshold, the method 400 proceeds to operation 416 (shown in FIG. 4B). Turning again to FIG. 4B, at operation 416, the resource auto-scaler 206 determines whether any VM-M 214 is available to be instantiated from the VM inventory. Also, if at operation 410, the resource auto-scaler 206 determines that the host capacity is not greater than the minimum host capacity required for VM application (i.e., event processing) execution, the method 400 proceeds to operation 416. If, at operation 416, the resource auto-scaler 206 determines that at least one VM-M 214 is available to be instantiated from the VM inventory, the method proceeds to operation 418.

At operation 418, the resource auto-scaler 206 determines whether the host capacity in a given cluster is greater than a minimum host capacity required to support the application VM available to be instantiated from the VM inventory. If the resource auto-scaler 206 determines the host capacity is greater than the minimum host capacity required to execute event processing tasks, the method 400 proceeds to operation 420, where the resource auto-scaler 206 spins up a new VM-M 214 and assigns a new host found in round-robin. The method 400 then proceeds to operation 414, where the method 400 ends.

If, however, at operation 418, the resource auto-scaler 206 determines that the host capacity is not greater than the minimum host capacity requested from VM application execution, the method 400 proceeds to operation 422, where the alert reporter 208 alerts (via the alert 210) the policy engine 116 of the event of insufficient host capacity in the SDM platform 102. To avoid the transient effect, at operation 422, the number of events reported to the alert reporter 208 can be computed.

From operation 422, the method 400 proceeds to operation 424, where the resource auto-scaler 206 determines if the number of insufficient host capacity events in a given measured time period is greater than an event design threshold. If the number of insufficient host capacity events in the given measured time period is less than the event design threshold, the method 400 returns to operation 402 (shown in FIG. 4A) and the method 400 restarts. If, however, the number of insufficient host capacity events in the given measure time period is greater than the event design threshold, the method 400 proceeds to operation 426, where the capacity manager updates the cluster host resource allocation, where the host resources include computing, memory, storage, and network interfaces. From operation 426, the method 400 then proceeds to operation 414, where the method 400 ends.

Figure 5:
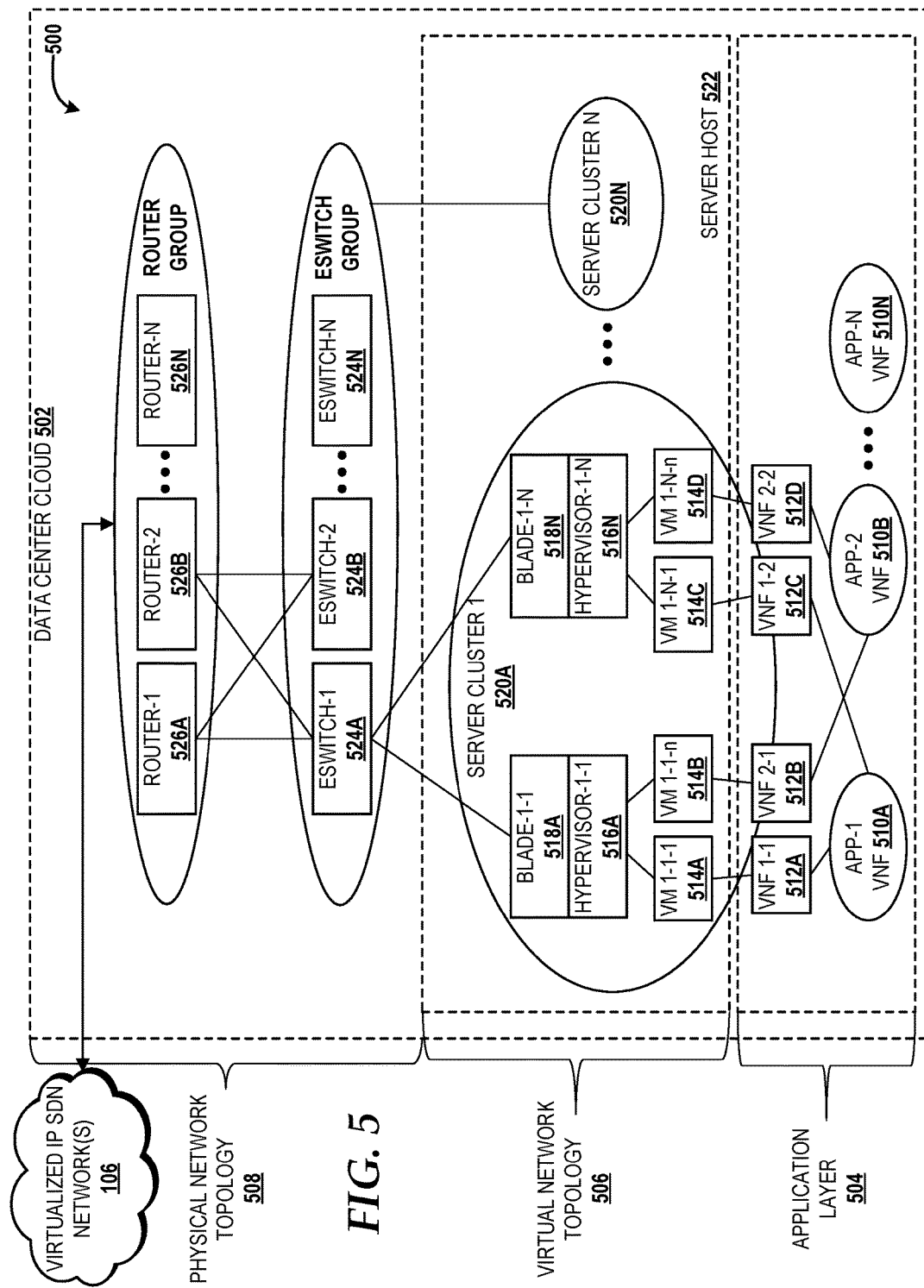
FIG. 5 is a diagram illustrating a network topology for a data center cloud, according to an illustrative embodiment.

Turning now to FIG. 5, a network topology 500 for a data center cloud 502 will be described, according to an illustrative embodiment. The illustrated network topology 500 includes three layers: an application ("APP") layer 504, a virtual network topology layer 506, and a physical network topology layer 508. The APP layer 504 can include one or more application VNFs 510A-510N, each of which can be divided into one or more sub-VNFs 512A-512D (referred to herein collectively as sub-VNFs 512) to be executed by one or more VMs 514A-514D (referred to herein collectively as VMs 514), such as the VM-Ms 214. In the context of the concepts and technologies disclosed herein, the VNFs 510 are event processing network functions for the SDM platform 102.

The virtual network topology layer 506 includes the VMs 514, one or more hypervisors 516A-516N (referred to herein collectively as hypervisors 516), and one or more server modules ("blades") 518A-518N (referred to herein collectively as blades 518). Each of the blades 518 can support one of the hypervisors 516 that, in turn, can manage one or more of the VMs 514. The blades 518 provide computing capacity to support the VMs 514 carrying the VNFs 512. The hypervisors 516 provide resource management among the VMs 514 supported thereby. A logical server cluster (e.g., one or more server clusters 520A-520N, referred to herein collectively as server clusters 520) is created for resource allocation and reallocation purpose, which includes the blades 518 in the same server host 522. Each server host 522 includes one or more of the server clusters 520.

The physical network topology layer 508 includes an Ethernet switch ("ESwitch") group, including one or more ESwitches 524A-524N (referred to herein collectively as ESwitch group 524). The physical network topology layer 508 also includes a router group, including one or more routers 526A-526N (referred to herein collectively as router group 526). The ESwitch group 524 provides traffic switching function among the blades 518. The router group 526 provides connectivity for traffic routing between the data center cloud 502 and the virtualized IP SDN network(s) 106. The router group 526 may or may not provide multiplexing functions, depending upon network design.

The virtual network topology layer 506 is dynamic by nature, and as such, the VMs 514 can be moved among the blades 518 as needed. The physical network topology layer 508 is more static, and as such, no dynamic resource allocation is involved in this layer. Through such a network topology configuration, the association among application VNFs 510, the VM 514 supporting the application VNFs 510, and the blades 518 that hosts the VM 514 can be determined.

In the illustrated example, a first VNF is divided into two sub-VNFs, VNF 1-1 512A and VNF 1-2 512C, which is executed by VM 1-1-1 514A and VM 1-N-1 514C, respectively. The VM 1-1-1 514A is hosted by the blade 1-1 518A and managed by the hypervisor 1-1 516A in the server cluster 1 520A of the server host 522. Traffic switching between the blade 1-1 518A and the blade 1-N 518N is performed via ESwitch-1 524A. Traffic communications between the ESwitch group 524 and the virtualized IP SDN network(s) 106 are performed via the router group 526. In this example, the VM 1-1-1 514A can be moved from the blade 1-1 518A to the blade 1-N 518N for VM live migration if the blade 1-1 518A is detected to have difficulty to support the VNF 1-1 512A performance requirements and the blade 1-N 518N has sufficient capacity and is available to support the VNF 1-1 512A performance requirements. The virtual network topology layer 506 is dynamic by nature due to real-time resource allocation/reallocation capability of cloud SDN. The association of application, VM, and blade host in this example is the VNF 1-1 512A is executed on the VM 1-1-1 514A hosted by the blade 1-1 518A in the server cluster 1 520A.

Figure 6:
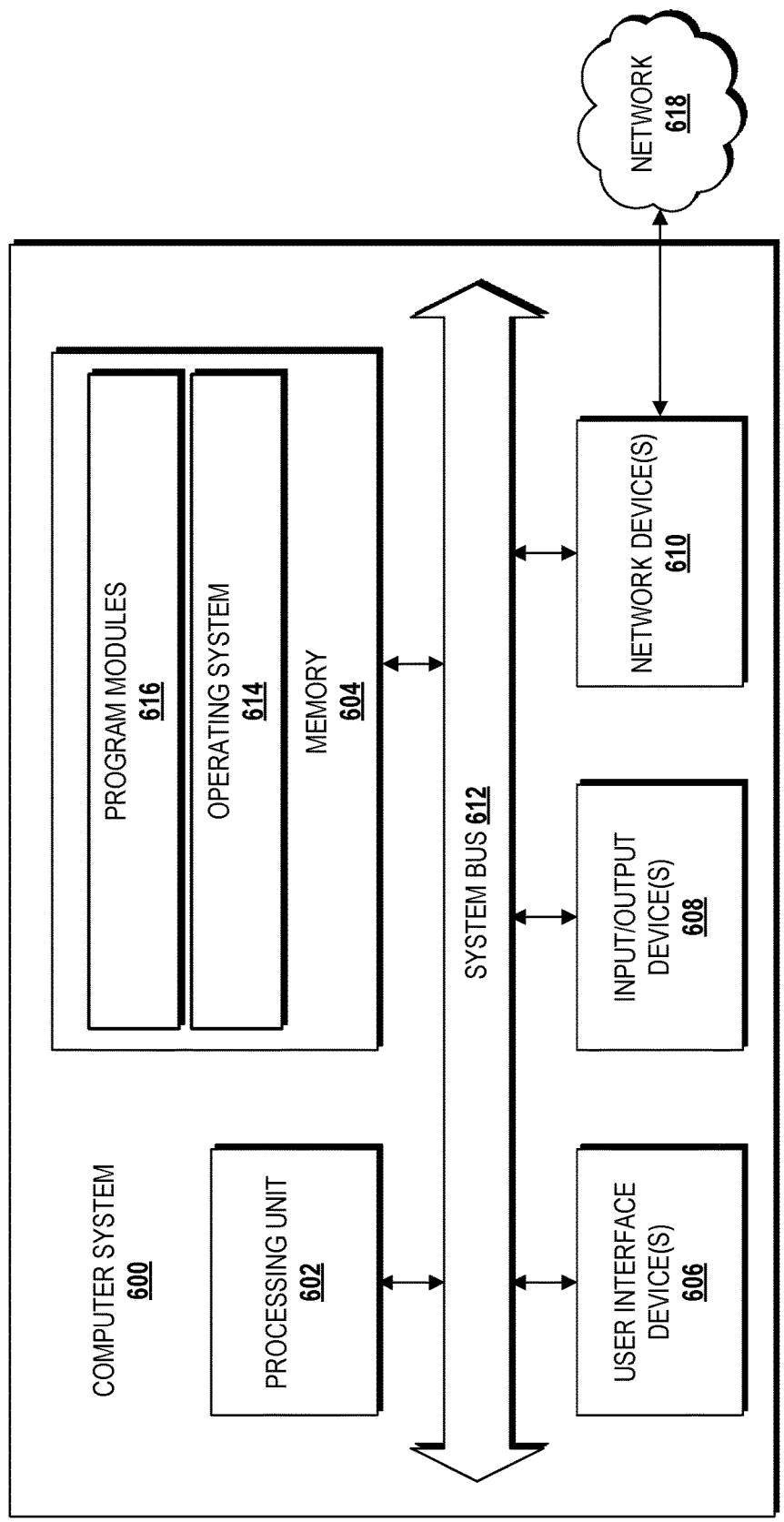
FIG. 6 is a block diagram illustrating an example computer system capable of implementing aspects of the embodiments presented herein.

Turning now to FIG. 6, a block diagram illustrating a computer system 600 configured to provide the functionality described herein for an auto-scaling SDM platform for SDN service assurance in accordance with various embodiments of the concepts and technologies disclosed herein is described. The computer system 600 includes a processing unit 602, a memory 604, one or more user interface devices 606, one or more input/output ("I/O") devices 608, and one or more network devices 610, each of which is operatively connected to a system bus 612. The system bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. The processing unit 802 can be a single processing unit or a multiple processing unit that includes more than one processing component. Processing units are generally known, and therefore are not described in further detail herein.

The memory 604 communicates with the processing unit 602 via the system bus 612. The memory 604 can include a single memory component or multiple memory components. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the management system QoS monitor 202, the management system QoS measurer 204, the resource auto-scaler 206, and the alert reporter 208. This and/or other programs can be embodied in computer-readable media containing instructions that, when executed by the processing unit 602, perform the methods 300, 400 described in detail above with respect to FIGS. 3, 4A, and 4B. According to embodiments, the program modules 616 may be embodied in hardware, software, firmware, or any combination thereof. Although not shown in FIG. 6, it should be understood that the memory 604 also can be configured to store any data disclosed herein.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network 618. Examples of the network devices 610 include, but are not limited to, a modem, a radio frequency ("RF") or infrared ("IR") transceiver, a telephonic interface, a bridge, a router, or a network card. The network 618 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 618 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 7:
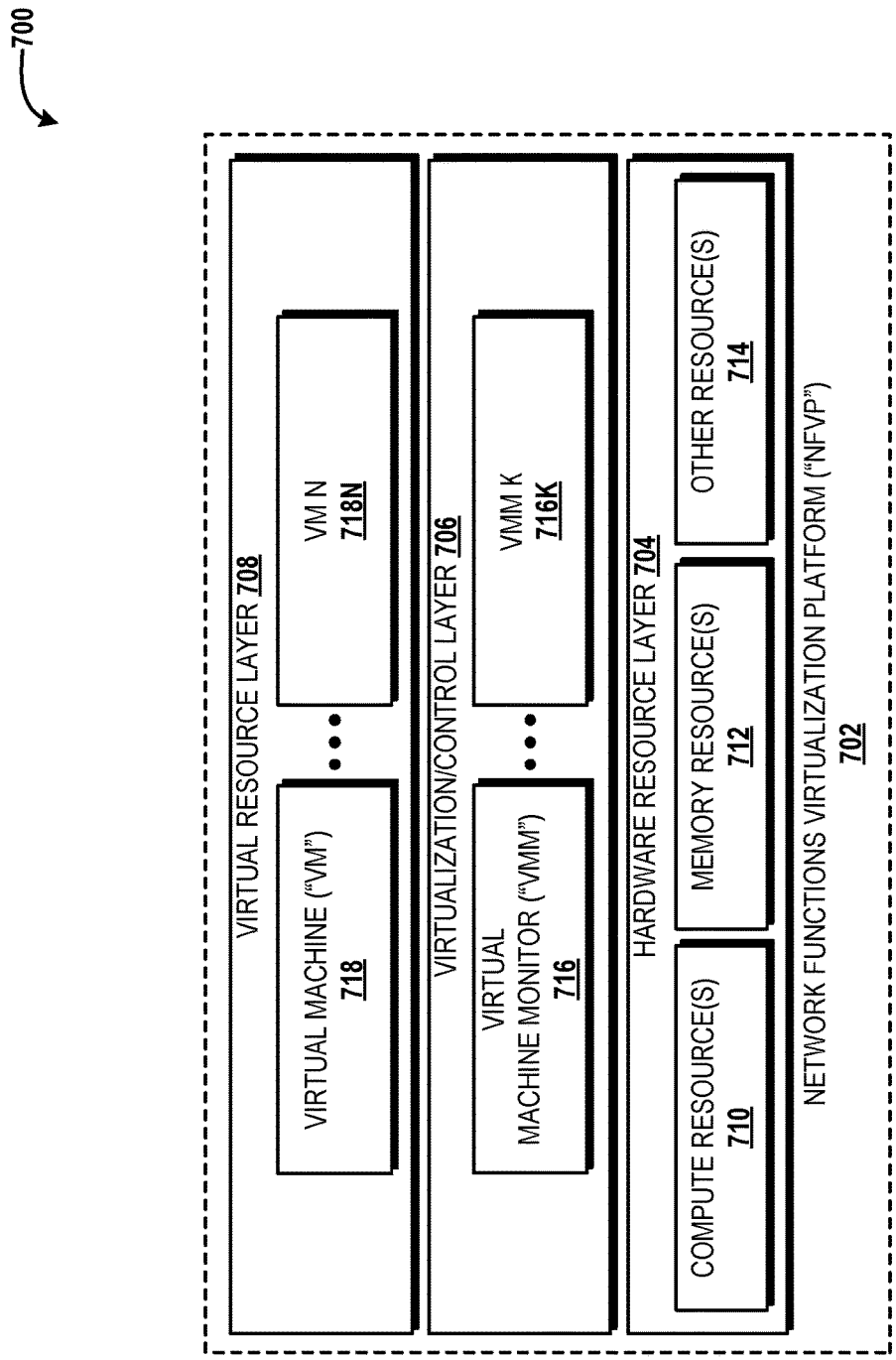
FIG. 7 is a block diagram illustrating a network functions virtualization platform ("NFVP"), according to an illustrative embodiment.

Referring now to FIG. 7, aspects of a network functions virtualization platform ("NFVP") 702 are described. The NFVP 702 is a shared infrastructure that can support multiple services and network applications, such as video streaming services described herein. The illustrated NFVP 702 includes a hardware resource layer 704, a virtualization/control layer 706, and a virtual resource layer 708 that work together to perform operations as will be described in detail herein. While connections are shown between some of the components illustrated in FIG. 7, it should be understood that some, none, or all of the components illustrated in FIG. 7 can be configured to interact with one another to carry out various functions described herein. In some embodiments, the components are arranged so as to communicate via one or more networks (not shown). Thus, it should be understood that FIG. 7 and the following description are intended to provide a general understanding of a suitable environment in which various aspects of embodiments can be implemented, and should not be construed as being limiting in any way.

The hardware resource layer 704 provides hardware resources, such as, for example, the hardware hosts 218. In the illustrated embodiment, the hardware resource layer 704 includes one or more compute resources 710, one or more memory resources 712, and one or more other resources 714. The compute resource(s) 710 can include one or more hardware components that perform computations to process data, and/or to execute computer-executable instructions of one or more application programs, operating systems, and/or other software. The compute resources 710 can include one or more central processing units ("CPUs") configured with one or more processing cores. The compute resources 710 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 710 can include one or more discrete GPUs. In some other embodiments, the compute resources 710 can include CPU and GPU components that are configured in accordance with a co-processing CPU/GPU computing model, wherein the sequential part of an application executes on the CPU and the computationally-intensive part is accelerated by the GPU. The compute resources 710 can include one or more system-on-chip ("SoC") components along with one or more other components, including, for example, one or more of the memory resources 712, and/or one or more of the other resources 714. In some embodiments, the compute resources 710 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 710 can be or can include one or more hardware components architected in accordance with an ARM architecture, available for license from ARM HOLDINGS of Cambridge, United Kingdom. Alternatively, the compute resources 710 can be or can include one or more hardware components architected in accordance with an x86 architecture, such an architecture available from INTEL CORPORATION of Mountain View, Calif., and others. Those skilled in the art will appreciate the implementation of the compute resources 710 can utilize various computation architectures, and as such, the compute resources 710 should not be construed as being limited to any particular computation architecture or combination of computation architectures, including those explicitly disclosed herein.

The memory resource(s) 712 can include one or more hardware components that perform storage operations, including temporary or permanent storage operations. In some embodiments, the memory resource(s) 712 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 710.

The other resource(s) 714 can include any other hardware resources that can be utilized by the compute resources(s) 710 and/or the memory resource(s) 712 to perform operations described herein. The other resource(s) 714 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 704 can be virtualized by one or more virtual machine monitors ("VMMs") 716-716K (also known as "hypervisors"; hereinafter "VMMs 716"), such as the hypervisors 216, operating within the virtualization/control layer 706 to manage one or more virtual resources that reside in the virtual resource layer 708. The VMMs 716 can be or can include software, firmware, and/or hardware that alone or in combination with other software, firmware, and/or hardware, manages one or more virtual resources operating within the virtual resource layer 708.

The virtual resources operating within the virtual resource layer 708 can include abstractions of at least a portion of the compute resources 710, the memory resources 712, the other resources 714, or any combination thereof. These abstractions are referred to herein as virtual machines ("VMs"). In the illustrated embodiment, the virtual resource layer 708 includes VMs 718-718N (hereinafter "VMs 718"), such as the VM-Ms 214. The VMs 718 can execute one or more applications to provide one or more services, such as, for example, streaming video services.

In some embodiments, a server can include a plurality of server clusters, such as the server clusters shown in FIG. 5. Each server cluster can include one or more of the VMs 718, one or more of the VMMs 716, and a plurality of host hardware resources, such as one or more of the compute resources 710, one or more of the memory resources 712, and one or more of the other resources 714.

Based on the foregoing, it should be appreciated that concepts and technologies directed to an auto-scaling SDM platform for SDN service assurance have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A computer-readable storage medium having instructions stored thereon that, when executed by a processor of a software-defined monitoring platform, cause the processor to perform operations comprising:

monitoring event data associated with a network event that occurred within a virtualized IP software-defined networking network that is monitored by a virtualized software-defined monitoring resources platform, wherein the software-defined monitoring platform comprises the virtualized software-defined monitoring resources platform;

measuring, based upon the event data associated with the network event, a quality of service performance metric associated with the virtualized software-defined monitoring resources platform, wherein the quality of service performance metric comprises an event packet loss metric that reflects a network event processing throughput for each event processor in the virtualized software-defined monitoring resources platform;

determining, based upon the event packet loss metric of the quality of service performance metric, that an auto-scaling operation is to be performed on the virtualized software-defined monitoring resources platform that monitors the virtualized IP software-defined networking network, wherein the auto-scaling operation comprises reconfiguration of the virtualized software-defined monitoring resources platform that monitors the virtualized IP software-defined networking network; and in response to determining that the auto-scaling operation is to be performed, reconfiguring the virtualized software-defined monitoring resources platform that monitors the virtualized IP software-defined networking network by adding virtual machine capacity for supporting event management tasks.

2. The computer-readable storage medium of claim 1, wherein the network event processing throughput occurs over a measured time period and is determined via a number of network events being successfully processed through network input and output of each event processor within the measured time period.

3. The computer-readable storage medium of claim 1, wherein determining that the auto-scaling operation is to be performed comprises determining that the virtualized software-defined monitoring resources platform has been degraded.

4. The computer-readable storage medium of claim 3, wherein determining that the virtualized software-defined monitoring resources platform has been degraded comprises determining that the event packet loss metric that reflects the network event processing throughput is below a threshold value.

5. The computer-readable storage medium of claim 1, wherein adding the virtual machine capacity for supporting the event management tasks comprises instantiating a new virtual machine for supporting the event management tasks on the software-defined monitoring platform.

6. The computer-readable storage medium of claim 5, wherein the operations further comprise generating an alert directed to a software-defined network controller to notify the software-defined network controller of the new virtual machine to be instantiated for supporting the event management tasks on the software-defined monitoring platform.

7. The computer-readable storage medium of claim 1, wherein adding the virtual machine capacity for supporting event management tasks comprises migrating a virtual machine for the software-defined monitoring platform to a new hardware host.

8. A method comprising:

monitoring, by a processor executing within a software-defined monitoring platform, event data associated with a network event that occurred within a virtualized IP software-defined networking network that is monitored by a virtualized software-defined monitoring resources platform, wherein the software-defined monitoring platform comprises the virtualized software-defined monitoring resources platform;

measuring, by the processor based upon the event data associated with the network event, a quality of service performance metric associated with the virtualized software-defined monitoring resources platform, wherein the quality of service performance metric comprises an event packet loss metric that reflects a network event processing throughput for each event processor in the virtualized software-defined monitoring resources platform;

determining, by the processor based upon the event packet loss metric of the quality of service performance metric, that an auto-scaling operation is to be performed on the virtualized software-defined monitoring resources platform that monitors the virtualized IP software-defined networking network; wherein the auto-scaling operation comprises reconfiguration of the virtualized software-defined monitoring resources platform that monitors the virtualized IP software-defined networking network; and in response to determining that the auto-scaling operation is to be performed, reconfiguring, by the processor executing within the software-defined monitoring platform, the virtualized software-defined monitoring resources platform that monitors the virtualized IP software-defined networking network by adding virtual machine capacity for supporting event management tasks.

9. The method of claim 8, wherein the network event processing throughput occurs over a measured time period and is determined via a number of network events being successfully processed through network input and output of each event processor within the measured time period.

10. The method of claim 8, wherein determining that the auto-scaling operation is to be performed comprises determining that the virtualized software-defined monitoring resources platform has been degraded.

11. The method of claim 10, wherein determining that the virtualized software-defined monitoring resources platform has been degraded comprises determining that the event packet loss metric that reflects the network event processing throughput is below a threshold value.

12. The method of claim 8, wherein adding the virtual machine capacity for supporting the event management tasks comprises instantiating a new virtual machine for supporting the event management tasks on the software-defined monitoring platform.

13. The method of claim 12, further comprising generating an alert directed to a software-defined network controller to notify the software-defined network controller of the new virtual machine to be instantiated for supporting the event management tasks on the software-defined monitoring platform.

14. The method of claim 8, wherein adding the virtual machine capacity for supporting the event management tasks comprises migrating a virtual machine for the software-defined monitoring platform to a new hardware host.

15. A system comprising:
a processor; and a memory that stores instructions that, when executed by the processor, cause the processor to perform operations comprising:

monitoring event data associated with a network event that occurred within a virtualized IP software-defined networking network that is monitored by a virtualized software-defined monitoring resources platform, wherein the virtualized software-defined monitoring resources platform is comprised within a software-defined monitoring platform, measuring, based upon the event data associated with the network event, a quality of service performance metric associated with the virtualized software-defined monitoring resources platform, wherein the quality of service performance metric comprises an event packet loss metric that reflects a network event processing throughput for each event processor in the virtualized software-defined monitoring resources platform, determining, based upon the event packet loss metric of the quality of service performance metric, that an auto-scaling operation is to be performed on the virtualized software-defined monitoring resources platform that monitors the virtualized IP software-defined networking network, wherein the auto-scaling operation comprises reconfiguration of the virtualized software-defined monitoring resources platform that monitors the virtualized IP software-defined networking network, and in response to determining that the auto-scaling operation is to be performed, reconfiguring the virtualized software-defined monitoring resources platform that monitors the virtualized IP software-defined networking network by adding virtual machine capacity for supporting event management tasks on the software-defined monitoring platform.

16. The system of claim 15, wherein the network event processing throughput occurs over a measured time period and is determined via a number of network events being successfully processed through network input and output of each event processor within the measured time period.

17. The system of claim 15, wherein determining that the auto-scaling operation is to be performed comprises determining that the virtualized software-defined monitoring resources platform has been degraded.

18. The system of claim 17, wherein determining that the virtualized software-defined monitoring resources platform has been degraded comprises determining that the event packet loss metric that reflects the event processing throughput is below a threshold value.

* * * * *